(12) United States Patent
Zhang et al.

(10) Patent No.: US 9,025,290 B2
(45) Date of Patent: May 5, 2015

(54) PROTECTIVE CIRCUIT FOR LOADS

(71) Applicants: Hong Fu Jin Precision Industry (ShenZhen) Co., Ltd., Shenzhen (CN); Hon Hai Precision Industry Co., Ltd., New Taipei (TW)

(72) Inventors: Wan-Hong Zhang, Shenzhen (CN); Hong-Ru Zhu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 175 days.

(21) Appl. No.: 13/770,981

(22) Filed: Feb. 19, 2013

(65) Prior Publication Data

US 2013/0271887 A1 Oct. 17, 2013

(30) Foreign Application Priority Data

Apr. 17, 2012 (CN) .......................... 2012 1 0112523

(51) Int. Cl.
*H02H 3/20* (2006.01)
*H02H 9/04* (2006.01)
*H02H 5/10* (2006.01)

(52) U.S. Cl.
CPC .. *H02H 3/20* (2013.01); *H02H 5/10* (2013.01)

(58) Field of Classification Search
USPC ......................................................... 361/91.5
See application file for complete search history.

(56) References Cited

U.S. PATENT DOCUMENTS

2012/0327544 A1* 12/2012 Peng et al. ................... 361/91.5

* cited by examiner

*Primary Examiner* — Dharti Patel
(74) *Attorney, Agent, or Firm* — Novak Druce Connolly Bove + Quigg LLP

(57) ABSTRACT

A protective circuit includes a first jack, a second jack, a first control unit, a detecting circuit, and a logic control circuit. The first jack is connected to a power supply, and includes a grounding wire and a live wire. The second jack is connected to a load, and includes a grounding wire and a live wire. The first control unit includes a first relay, the first relay is connected to the live wire of the first jack and the live wire of the second jack. The detecting circuit detects whether the grounding wire of the first jack is grounded, and outputs indication signals accordingly. The logic control circuit outputs a control signal to the first control unit according to the indication signals to turn on/off the first relay, for allowing the live wire of the first jack to be connected to/disconnected from the live wire of the second jack.

19 Claims, 3 Drawing Sheets

US 9,025,290 B2

PROTECTIVE CIRCUIT FOR LOADS

BACKGROUND

1. Technical Field

The disclosure generally relates to protective circuits, and particularly to a protective circuit for a load.

2. Description of the Related Art

Live wires, neutral wires, and grounding wires are electronically connected between a power supply and a load (e.g., a personal computer) to power the load. A first group of capacitors are electronically connected between the neutral wire and the grounding wire, and a second group of capacitors are electronically connected between the live wire and the grounding wire. When the grounding wire is grounded, the first and second groups of capacitors can filter voltage output from the power supply. When the grounding wire is not grounded, the first and second group of capacitors may generate alternating current (AC) having a high voltage (for example, 110V) because of capacitive coupling, and this may damage the load.

Therefore, there is room for improvement within the art.

BRIEF DESCRIPTION OF THE DRAWINGS

Many aspects of the present embodiment can be better understood with reference to the following drawings. The components in the drawings are not necessarily drawn to scale, the emphasis instead being placed upon clearly illustrating the principles of the present embodiment.

DETAILED DESCRIPTION

Figure 1:
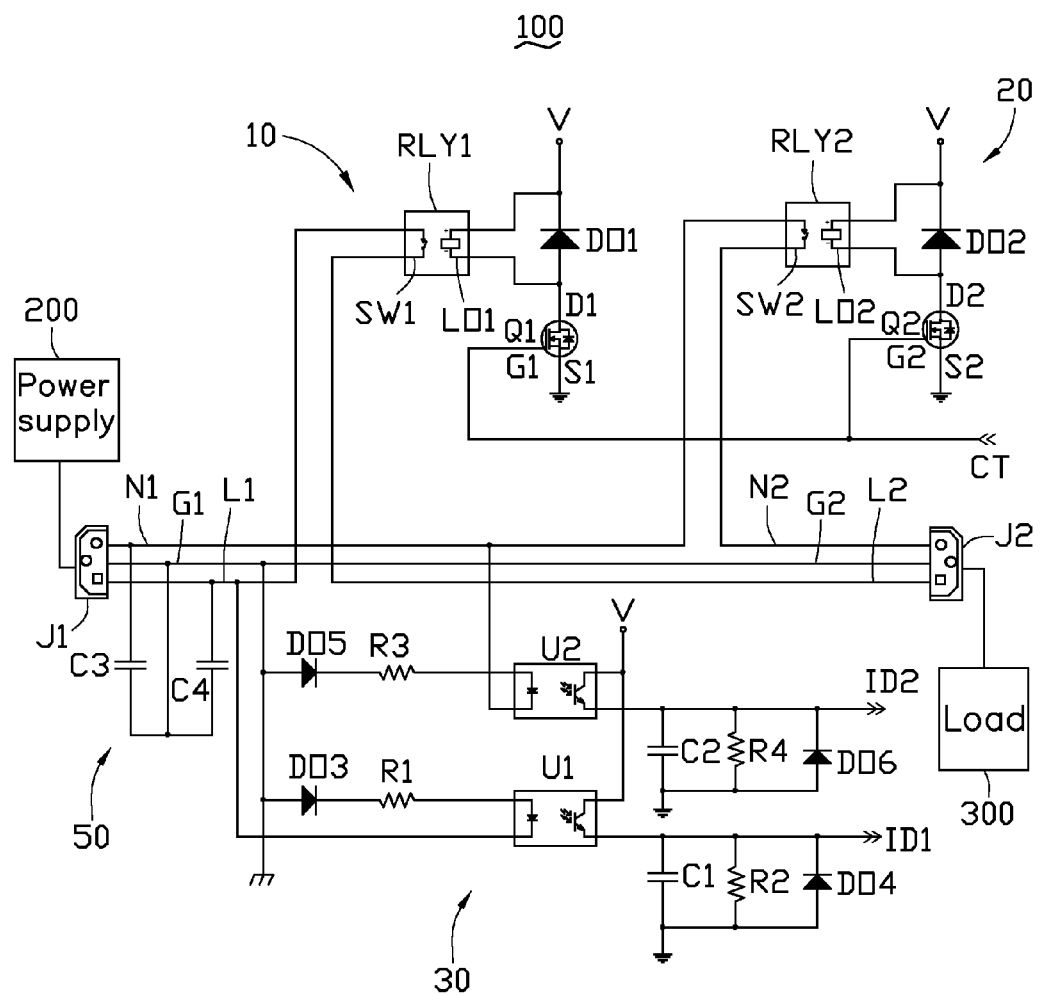
FIGS. 1-2 are a circuit diagram of a protective circuit for a load, according to a first exemplary embodiment.
Figure 2:
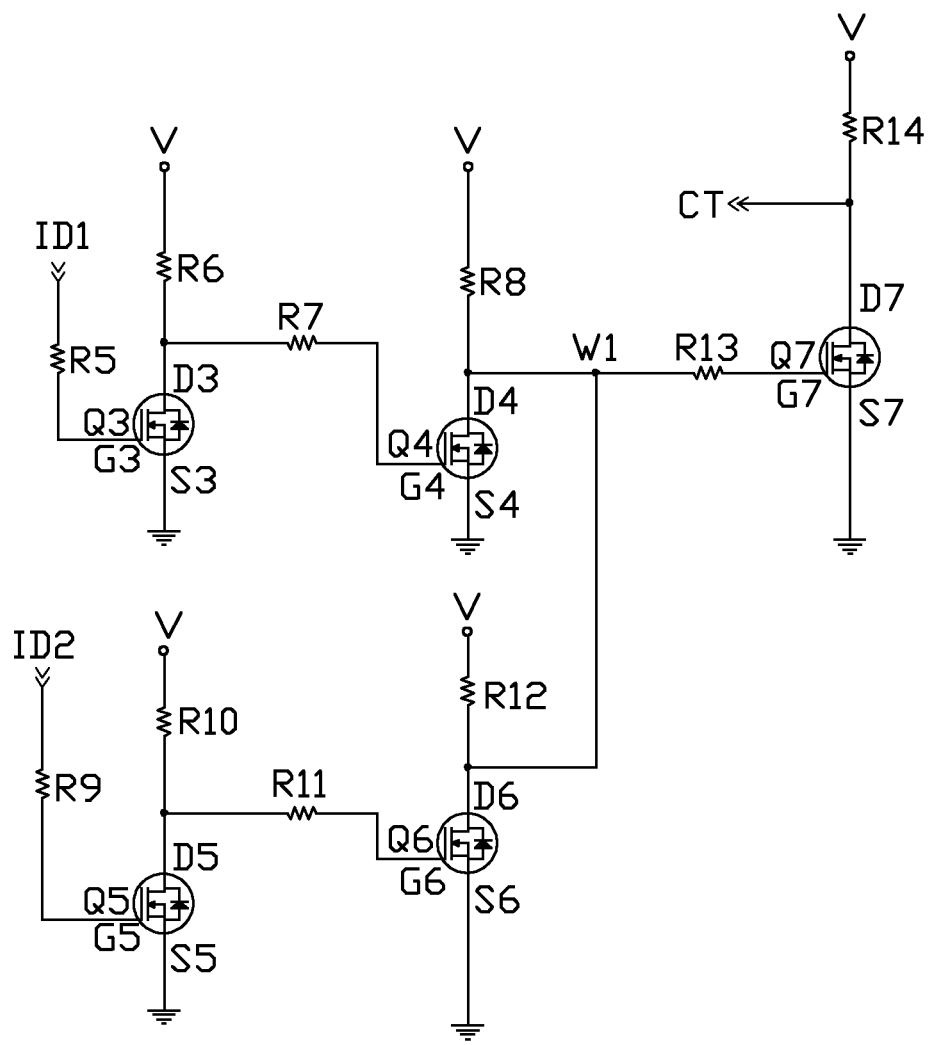

FIGS. 1-2 show a protective circuit 100, according to a first exemplary embodiment. The protective circuit 100 is electronically connected between a power supply 200 and a load (e.g., a personal computer) 300.

The protective circuit 100 includes a first jack J1, a second jack J2, a first control unit 10, a second control unit 20, a detecting circuit 30, a logic control circuit 40, and a filtering circuit 50.

The first jack J1 is electronically connected to the power supply 200 to receive power (a voltage of the power is about 220V in one example). In addition, a neutral wire N1, a grounding wire G1, and a live wire L1 are electronically connected to the first jack J1. The second jack J2 is electronically connected to the load 300, and a neutral wire N2, a grounding wire G2, and a live wire L2 are electronically connected to the second jack J2. The grounding wires G1 and G2 are interconnected, both of the live wires L1 and L2 are electronically connected to the first control unit 10. Both of the neutral wires N1 and N2 are electronically connected to the second control unit 20.

The first control unit 10 controls the live wire L1 to be electronically connected to/disconnected from the live wire L2. The first control unit 10 includes a first metal oxide semiconductor field effect transistor (MOSFET) Q1, a first diode DOL and a first relay RLY1. The first MOSFET Q1 includes a gate G1, a source S1, and a drain D1. The gate G1 is electronically connected to the logic control circuit 40, the source S1 is connected to ground, the drain D1 is electronically connected to an anode of the first diode DO1 and a cathode of the first diode DO1 is electronically connected to a power V of about 5V. The first relay RLY1 includes an induction coil LO1 and a switch SW1. The first diode DO1 is further electronically connected between two ends of the induction coil LO1, and the switch SW1 is electronically connected between the live wires L1 and L2. When the first MOSFET Q1 is turned on, the induction coil LO1 is activated to allow the switch SW1 to turn on, and then the live wires L1 and L2 are interconnected. When the first MOSFET Q1 is turned off, the induction coil LO1 is inactivated to allow the switch SW1 to turn off, and then the live wires L1 and L2 are disconnected from each other.

The second control unit 20 controls the neutral wire N1 to be electronically connected to/disconnected from the neutral wire N2. The second control unit 20 includes a second MOSFET Q2, a second diode D02, and a second relay RLY2. The second MOSFET Q2 includes a gate G2, a source S2, and a drain D2. The gate G2 is electronically connected to the logic control circuit 40, the source S2 is connected to ground, the drain D2 is electronically connected to an anode of the second diode D02, and a cathode of the second diode DO2 is electronically connected to the power V. The second relay RLY2 includes an induction coil LO2 and a switch SW2. The second diode DO2 is further electronically connected between two ends of the induction coil LO2, and the switch SW2 is electronically connected between the neutral wires N1 and N2. When the second MOSFET Q2 is turned on, the induction coil LO2 is activated to allow the switch SW2 to turn on, and then the neutral wires N1 and N2 are interconnected. When the second MOSFET Q2 is turned off, the induction coil LO2 is inactivated to allow the switch SW2 to turn off, and then the neutral wires N1 and N2 are disconnected from each other.

The detecting circuit 30 detects whether the grounding wire G1 is grounded. If the grounding wire G1 is grounded, the detecting circuit 30 outputs an indication signal ID1. If the grounding wire G1 is not grounded, the detecting circuit 30 outputs an indication signal ID2. The detecting circuit 30 includes a third diode D03, a fourth diode D04, a fifth diode D05, and sixth diode D06, a first optical coupler U1, a second optical coupler U2, a first capacitor C1, a second capacitor C2, and resistors R1-R4.

An anode of the third diode DO3 is connected to ground, and is electronically connected to the grounding wire G1. The first optical coupler U1 includes a lighting component (not labeled) and a photoreceptor (not labeled). A first end of the lighting component of the first optical coupler U1 is electronically connected to the live wire L1, and a second end of the lighting component of the first optical coupler U1 is electronically connected to a cathode of the third diode DO3 via the resistor R1. A first end of the photoreceptor of the first optical coupler U1 is electronically connected to the power V, the first capacitor C1, the resistor R2, and the fourth diode DO4 are electronically connected between a second end of the photoreceptor of the first optical coupler U1 and ground in parallel. The first capacitor C1 is configured to output the indication signal D1.

An anode of the fifth diode DO5 is connected to ground, and is electronically connected to the grounding wire G1. The second optical coupler U2 includes a lighting component (not labeled) and a photoreceptor (not labeled). A first end of the lighting component of the second optical coupler U2 is electronically connected to the neutral wire L1, and a second end of the lighting component of the second optical coupler U2 is electronically connected to a cathode of the fifth diode DO5 via the resistor R3. A first end of the photoreceptor of the second optical coupler U2 is electronically connected to the power V, the second capacitor C2, the resistor R4, and the sixth diode DO6 are electronically connected between a second end of the photoreceptor of the second optical coupler U2 and ground in parallel. The second capacitor C2 is configured to output the indication signal D2.

FIG. 2 shows that the logic control circuit 40 is electronically connected to the detecting circuit 30, and outputs a control signal CT to the first control unit 10 and the second control unit 20 according to the indication signals ID1 and ID2. In the first exemplary embodiment, the logic control circuit 40 includes a third MOSFET Q3, a fourth MOSFET Q4, a fifth MOSFET Q5, a sixth MOSFET Q6, a seventh MOSFET Q7, and resistors R5-R15. The third MOSFET Q3 includes a gate G3, a source S3, and a drain D3. The fourth MOSFET Q4 includes a gate G4, a source S4, and a drain D4. The fifth MOSFET Q5 includes a gate G5, a source S5, and a drain D5. The sixth MOSFET Q6 includes a gate G6, a source S6, and a drain D6. The seventh MOSFET Q7 includes a gate G7, a source S7, and a drain D7.

The gate G3 is electronically connected to a cathode of the fourth diode DO4 via the resistor R5, the source S3 is connected to ground, and the drain D3 is electronically connected to the power V via the resistor R6. The gate G4 is electronically connected to the drain D3 via the resistor R7, the source S4 is connected to ground, and the drain D4 is electronically connected to the power V via the resistor R8. The gate G5 is electronically connected to a cathode of the sixth diode DO6 via the resistor R9, the source S5 is connected to ground, and the drain D5 is electronically connected to the power V via the resistor R10. The gate G6 is electronically connected to the drain D5 via the resistor R11, the source S6 is connected to ground, and the drain D6 is electronically connected to the power V via the resistor R12. The gate G7 is electronically connected to the drain D4 and the drain D6 via the resistor R13, the source S7 is connected to ground, the drain D7 is electronically connected to the power V via the resistor R14, and is electronically connected to the gate G1 of the first MOSFET Q1 and the gate G2 of the second MOSFET Q2. A node W1 is formed between the drain D4, the drain D6, and the gate G7.

The filtering circuit 50 includes a third capacitor C3 and a fourth capacitor C4. The third capacitor C3 is electronically connected between the neutral wire N1 and the grounding wire G1. The fourth capacitor C4 is electronically connected between the live wire L1 and the grounding wire G1.

When the grounding wire G1 is grounded, the lighting component of the first optical coupler U1 is turned on by a voltage difference between the live wire L1 and the grounding wire G1 (a voltage of the live wire L1 is about +220V, and a voltage of the grounding wire L1 is about 0V), and then the first capacitor C1 is charged. When the first capacitor C1 is discharging, the first capacitor C1 outputs the indication signal ID1 with high voltage (e.g., 3V). On the other hand, the second optical coupler U2 is disabled (turned off) because of no voltage difference between the neutral wire N1 and the grounding wire G1, thus, the second capacitor C2 outputs the indication signal ID2 with a low voltage (e.g., 0.3V). Then, the third MOSFET Q3 receives the indication signal ID1, and is turned on accordingly, and the fourth MOSFET Q4 is turned off. The fifth MOSFET Q5 receives the indication signal ID2, and is turned off accordingly, and the sixth MOSFET Q6 is turned on. Thus, a voltage of the node W1 may be pulled down (for example, the voltage of the node W1 is about 0.5V), and then the seventh MOSFET Q7 is turned off. Therefore, the control signal CT is a high voltage (e.g., 3V), and both the first MOSFET Q1 and the second MOSFET Q2 are turned on. The switch SW1 of the first relay RLY1 is turned on, and the live wires L1 and L2 are interconnected. The switch SW2 of the second relay RLY2 is turned on, and the neutral wires N1 and N2 are interconnected. Thus, the load 300 can be powered by the power supply 200.

When the grounding wire G1 is not grounded, the lighting component of the first optical coupler U1 is turned on by the voltage difference between the live wire L1 and the grounding wire G (the voltage of the live wire L1 is about −220V, and the voltage of the grounding wire L1 is about +110V), and then the first capacitor C1 is charged. When the first capacitor C1 is discharging, the first capacitor C1 outputs the indication signal ID1 with high voltage (e.g., 3V). On the other hand, the second optical coupler U2 is turned on by a voltage difference between the neutral wire N1 and the grounding wire G1 (the voltage of the neutral wire N1 is about 0V, and the voltage of the grounding wire L1 is about +110V), and then the second capacitor C2 is charged. When the second capacitor C2 is discharging, the second capacitor C2 outputs the indication signal ID2 with high voltage (e.g., 3V). Then, the third MOSFET Q3 and the fifth MOSFET Q5 are turned on, and the fourth MOSFET Q4 and the sixth MOSFET Q6 are turned off. Thus, the voltage of the node W1 may be pulled up (for example, the voltage of the node W1 is about 3V), and then the seventh MOSFET Q7 is turned on. Therefore, the control signal CT is a low voltage (e.g., 0.5V), and both the first MOSFET Q1 and the second MOSFET Q2 are turned off. The switch SW1 of the first relay RLY1 is turned off, and the live wires L1 and L2 are disconnected from each other. The switch SW2 of the second relay RLY2 is turned off, and the neutral wires N1 and N2 are disconnected from each other. Thus, the power supply 200 will not power the load 300 to protect the load 300 from being damaged.

Figure 3:
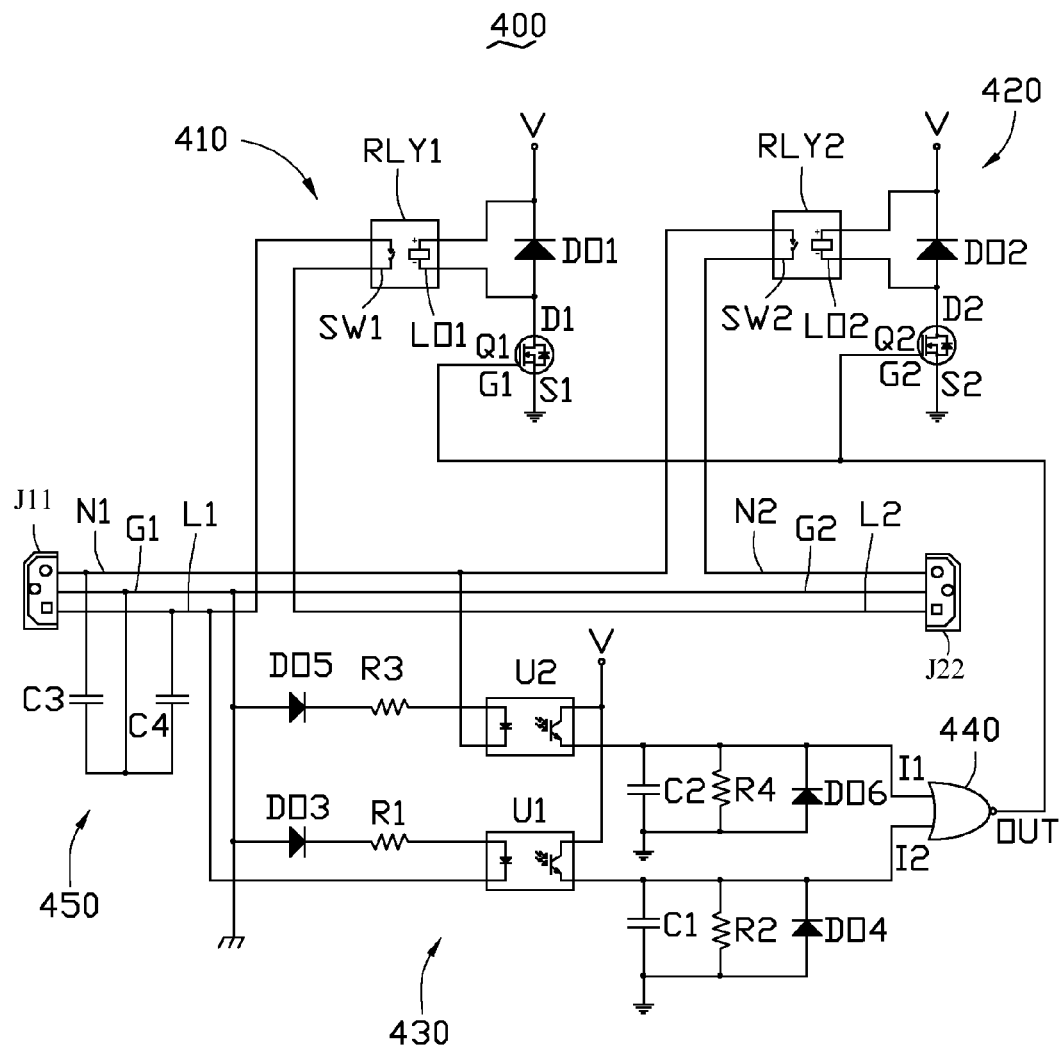
FIG. 3 is a circuit diagram of a protective circuit for a load, according to a second exemplary embodiment.

FIG. 3 shows a protective circuit 400, according to a second exemplary embodiment. The protective circuit 400 includes a first jack J11, a second jack J22, a first control unit 410, a second control unit 420, a detecting circuit 430, a logic control circuit 440, and a filtering circuit 450. The first control unit 410 and the second control unit 420 are substantially the same as the first control unit 10 and the second control unit 20 of the first exemplary embodiment, respectively. The detecting circuit 430 and the filtering circuit 450 are the equivalents of the detecting circuit 30 and the filtering circuit 50 of the first exemplary embodiment, respectively.

In the second exemplary embodiment, the logic control circuit 440 is different as it is a NAND gate, and includes a first input pin I1, a second input pin I2, and an output pin OUT. The first input pin I1 is electronically connected to a cathode of the fourth diode DO4 of the detecting circuit 430. The second input pin I2 is electronically connected to a cathode of the sixth diode DO6 of the detecting circuit 430, and the output pin OUT is electronically connected to the gate G1 of the first MOSFET Q1 and the gate G2 of the second MOSFET Q2. A function of the logic control circuit 440 is substantially the same as the logic control circuit 40 of the first exemplary embodiment.

In other embodiments, the second control unit 20/420 can be omitted, and the neutral wires N1 and N2 can be directly interconnected.

The protective circuit 100 detects whether the grounding wire G1 is grounded via the detecting circuit 30, and outputs the indication signals ID1 and ID2 accordingly. The logic control circuit 40 outputs the control signal CT to the first control unit 10 and the second control unit 20 according to the indication signals ID1 and ID2. Thus, the first control unit 10 can control the live wire L1 to be electronically connected to/disconnected from the live wire L2, and the second control unit 20 can control the neutral wire N1 to be electronically connected to/disconnected from the neutral wire N2. Therefore, if the grounding wire G1 is grounded, the power supply 200 can power the load 300. If the grounding wire G1 is not grounded, the power supply 200 will not power the load 300 to protect the load 300 from being damaged.

Although numerous characteristics and advantages of the exemplary embodiments have been set forth in the foregoing description, together with details of the structures and functions of the exemplary embodiments, the disclosure is illustrative only, and changes may be made in detail, especially in the matters of arrangement of parts within the principles of disclosure to the full extent indicated by the broad general meaning of the terms in which the appended claims are expressed.

What is claimed is:

1. A protective circuit electronically connected between a power supply and a load, the protective circuit comprising:
   a first jack electronically connected to the power supply, and comprising a grounding wire and a live wire;
   a second jack electronically connected to the load, and comprising a grounding wire and a live wire, the grounding wire of the second jack electronically connected to the grounding wire of the first jack;
   a first control unit comprising a first relay, the first relay electronically connected to the live wire of the first jack and the live wire of the second jack;
   a detecting circuit detecting whether the grounding wire of the first jack is grounded, and outputting indication signals according to detection; and
   a logic control circuit electronically connected between the detecting circuit and the first control unit; the logic control circuit outputting a control signal to the first control unit according to the indication signals to turn on/off the first relay, for allowing the live wire of the first jack to be connected to/disconnected from the live wire of the second jack.

2. The protective circuit as claimed in claim 1, wherein the first control unit further includes a first metal oxide semiconductor field effect transistor (MOSFET) and a first diode, the first MOSFET includes a gate, a source, and a drain, the gate is electronically connected to the logic control circuit, the source is connected to ground, the drain is electronically connected to an anode of the first diode, and a cathode of the first diode is electronically connected to a power.

3. The protective circuit as claimed in claim 2, wherein the first relay includes an induction coil and a switch, the first diode is electronically connected between two ends of the induction coil, and the switch is electronically connected between the live wire of the first jack and the live wire of the second jack.

4. The protective circuit as claimed in claim 2, further comprising a second control unit that includes a second MOSFET, a second diode, and a second relay, the second MOSFET includes a gate, a source, and a drain, the gate of the second MOSFET is electronically connected to the logic control circuit, the source of the second MOSFET is connected to ground, the drain of the second MOSFET is electronically connected to an anode of the second diode, and a cathode of the second diode is electronically connected to the power.

5. The protective circuit as claimed in claim 4, wherein the first jack further includes a neutral wire, the second jack further includes a neutral wire, the second relay includes an induction coil and a switch, the second diode is electronically connected between two ends of the induction coil of the second relay, and the switch of the second relay is electronically connected between the neutral wire of the first jack and the neutral wire of the second jack.

6. The protective circuit as claimed in claim 4, wherein the first jack further includes a neutral wire, the detecting circuit includes a third diode, a fourth diode, a first optical coupler, and a first capacitor, an anode of the third diode is connected to ground, and is electronically connected to the grounding wire of the first jack, the first optical coupler includes a lighting component and a photoreceptor, a first end of the lighting component is electronically connected to the live wire of the first jack, a second end of the lighting component is electronically connected to a cathode of the third diode, a first end of the photoreceptor is electronically connected to a power, the first capacitor and the fourth diode are electronically connected between a second end of the photoreceptor and ground in parallel, the first capacitor outputs the indication signals.

7. The protective circuit as claimed in claim 6, wherein the detecting circuit includes a fifth diode, a sixth diode, a second optical coupler, and a second capacitor, an anode of the fifth diode is connected to ground, and is electronically connected to the grounding wire of the first jack, the second optical coupler includes a lighting component and a photoreceptor, a first end of the lighting component of the second optical coupler is electronically connected to the neutral wire of the first jack, a second end of the lighting component of the second optical coupler is electronically connected to a cathode of the fifth diode, a first end of the photoreceptor of the second optical coupler is electronically connected to the power, the second capacitor and the sixth diode are electronically connected between a second end of the photoreceptor of the second optical coupler and ground in parallel, the second capacitor outputs the indication signals.

8. The protective circuit as claimed in claim 7, wherein the logic control circuit includes a third MOSFET, and a fourth MOSFET, the third MOSFET includes a gate, a source, and a drain, the fourth MOSFET includes a gate, a source, and a drain, the gate of the third MOSFET is electronically connected to a cathode of the fourth diode, the source of the third MOSFET is connected to ground, the drain of the third MOSFET is electronically connected to the power, the gate of the fourth MOSFET is electronically connected to the drain of the third MOSFET, the source of the fourth MOSFET is connected to ground, and the drain of the fourth MOSFET is electronically connected to the power.

9. The protective circuit as claimed in claim 8, wherein the logic control circuit includes a fifth MOSFET, and a sixth MOSFET, the fifth MOSFET includes a gate, a source, and a drain, the sixth MOSFET includes a gate, a source, and a drain, the gate of the fifth MOSFET is electronically connected to a cathode of the sixth diode, the source of the fifth MOSFET is connected to ground, the drain of the fifth MOSFET is electronically connected to the power, the gate of the sixth MOSFET is electronically connected to the drain of the fifth MOSFET, the source of the sixth MOSFET is connected to ground, and the drain of the sixth MOSFET is electronically connected to the power.

10. The protective circuit as claimed in claim 9, wherein the logic control circuit includes a seventh MOSFET, the seventh MOSFET includes a gate, a source, and a drain, the gate of the seventh MOSFET is electronically connected to the drain of the fourth MOSFET and the drain of the sixth MOSFET, the source of the seventh MOSFET is connected to ground, the drain of the seventh MOSFET is electronically connected to the power, and is electronically connected to the gate of the first MOSFET and the gate of the second MOSFET.

11. The protective circuit as claimed in claim 7, wherein the logic control circuit is a NAND gate, and includes a first input pin, a second input pin, and an output pin, the first input pin is electronically connected to a cathode of the fourth diode of the detecting circuit, the second input pin is electronically connected to a cathode of the sixth diode of the detecting circuit, and the output pin is electronically connected to the gate of the first MOSFET and the gate of the second MOSFET.

12. A protective circuit electronically connected between a power supply and a load, the protective circuit comprising:
a first jack electronically connected to the power supply, and comprising a grounding wire and a live wire;
a second jack electronically connected to the load, and comprising a grounding wire and a live wire, the grounding wire of the second jack electronically connected to the grounding wire of the first jack;
a first control unit comprising a first relay, the first relay electronically connected to the live wire of the first jack and the live wire of the second jack;
a detecting circuit detecting whether the grounding wire of the first jack is grounded; and
a logic control circuit electronically connected between the detecting circuit and the first control unit;
wherein if the grounding wire of the first jack is grounded, the detecting circuit outputs a first indication signal to the logic control circuit, the logic control circuit outputs a first control signal to the first control unit according to the first indication signal to turn on the first relay, for allowing the live wire of the first jack to be connected to the live wire of the second jack; and
wherein if the grounding wire of the first jack is not grounded, the detecting circuit outputs a second indication signal to the logic control circuit, the logic control circuit outputs a second control signal to the first control unit according to the second indication signal to turn off the first relay, for allowing the live wire of the first jack to be disconnected from the live wire of the second jack.

13. The protective circuit as claimed in claim 12, wherein the first control unit further includes a first metal oxide semiconductor field effect transistor (MOSFET) and a first diode, the first MOSFET includes a gate, a source, and a drain, the gate is electronically connected to the logic control circuit, the source is connected to ground, the drain is electronically connected to an anode of the first diode, and a cathode of the first diode is electronically connected to a power.

14. The protective circuit as claimed in claim 13, wherein the first relay includes an induction coil and a switch, the first diode is electronically connected between two ends of the induction coil, and the switch is electronically connected between the live wire of the first jack and the live wire of the second jack.

15. The protective circuit as claimed in claim 13, further comprising a second control unit that includes a second MOSFET, a second diode, and a second relay, the second MOSFET includes a gate, a source, and a drain, the gate of the second MOSFET is electronically connected to the logic control circuit, the source of the second MOSFET is connected to ground, the drain of the second MOSFET is electronically connected to an anode of the second diode, and a cathode of the second diode is electronically connected to a power.

16. The protective circuit as claimed in claim 15, wherein the first jack further includes a neutral wire, the second jack further includes a neutral wire, the second relay includes an induction coil and a switch, the second diode is electronically connected between two ends of the induction coil of the second relay, and the switch of the second relay is electronically connected between the neutral wire of the first jack and the neutral wire of the second jack.

17. The protective circuit as claimed in claim 15, wherein the first jack further includes a neutral wire, the detecting circuit includes a third diode, a fourth diode, a first optical coupler, and a first capacitor, an anode of the third diode is connected to ground, and is electronically connected to the grounding wire of the first jack, the first optical coupler includes a lighting component and a photoreceptor, a first end of the lighting component is electronically connected to the live wire of the first jack, a second end of the lighting component is electronically connected to a cathode of the third diode, a first end of the photoreceptor is electronically connected to a power, the first capacitor and the fourth diode are electronically connected between a second end of the photoreceptor and ground in parallel, the first capacitor outputs the indication signals.

18. The protective circuit as claimed in claim 17, wherein the detecting circuit includes a fifth diode, a sixth diode, a second optical coupler, and a second capacitor, an anode of the fifth diode is connected to ground, and is electronically connected to the grounding wire of the first jack, the second optical coupler includes a lighting component and a photoreceptor, a first end of the lighting component of the second optical coupler is electronically connected to the neutral wire of the first jack, a second end of the lighting component of the second optical coupler is electronically connected to a cathode of the fifth diode, a first end of the photoreceptor of the second optical coupler is electronically connected to the power, the second capacitor and the sixth diode are electronically connected between a second end of the photoreceptor of the second optical coupler and ground in parallel, the second capacitor outputs the indication signals.

19. The protective circuit as claimed in claim 18, wherein the logic control circuit is a NAND gate, and includes a first input pin, a second input pin, and an output pin, the first input pin is electronically connected to a cathode of the fourth diode of the detecting circuit, the second input pin is electronically connected to a cathode of the sixth diode of the detecting circuit, and the output pin is electronically connected to the gate of the first MOSFET and the gate of the second MOSFET.

* * * * *